F. M. LEWIS.
DIFFERENTIAL MECHANISM.
APPLICATION FILED OCT. 19, 1917.

1,319,655.

Patented Oct. 21, 1919.
2 SHEETS—SHEET 1.

Witness:
Leonard W. Novander.

Inventor
Frank M. Lewis
By Pond & Wilson
Attys.

F. M. LEWIS.
DIFFERENTIAL MECHANISM.
APPLICATION FILED OCT. 19, 1917.
1,319,655.
Patented Oct. 21, 1919.
2 SHEETS—SHEET 2.
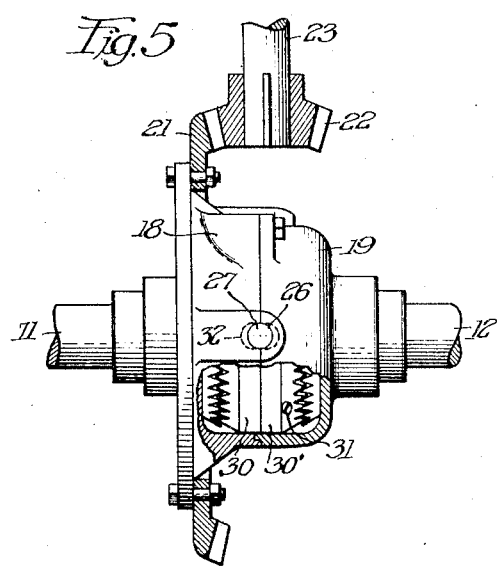
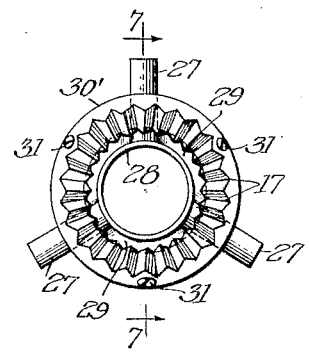
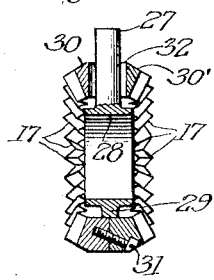
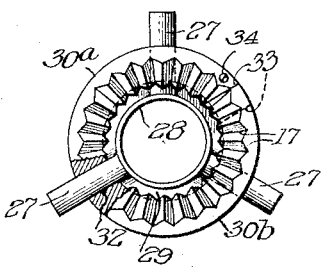
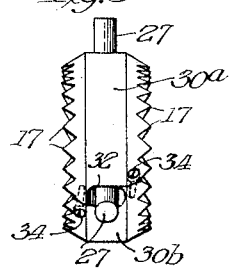
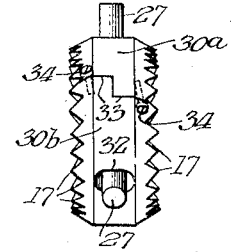
Witness:
Leonard W. Novander.
Inventor
Frank M. Lewis
By Pond & Wilson
Attys

UNITED STATES PATENT OFFICE.

FRANK M. LEWIS, OF CHICAGO, ILLINOIS.

DIFFERENTIAL MECHANISM.

1,319,655.      Specification of Letters Patent.      Patented Oct. 21, 1919.

Application filed October 19, 1917. Serial No. 197,377.

*To all whom it may concern:*

Be it known that I, FRANK M. LEWIS, a citizen of the United States, residing at Chicago, in the county of Cook and State of Illinois, have invented certain new and useful Improvements in Differential Mechanisms, of which the following is a specification.

My invention relates to improvements in differential mechanisms, and the objects of my improvements, when applied to motor vehicles, are, first, to provide a construction wherein the driving power on the traction wheels shall be equalized under normal running conditions; second, to provide a construction which shall reduce the liability of skidding or swerving of the car at high speed or on slippery roads, and shall prevent one wheel from spinning while the other is stuck in mud, ruts or the like, third, to protect the tires from grinding and injury and reduce power waste by limiting the wheel-travel to the fewest revolutions for a given distance, and fourth, to afford automatic compensation for the difference in travel of motor vehicle wheels.

With the foregoing and other objects in view, my invention consists in the novel features and in the novel combination and arrangement of parts hereinafter fully described, illustrated in the accompanying drawings forming a part of this specification, and particularly pointed out in the claims hereunto appended. Broadly stated, my invention comprises a divided or two-part shaft with driven members secured to the proximate ends of the shaft, and power-imparting means capable of rotation on the shaft and carrying a single driving member surrounding said shaft between said driven members and mounted for lateral bodily movement relatively to the power-imparting means, and normally in power-transmitting engagement with both of the driven members, and adapted to be forced by the road power of a vehicle wheel out of engagement with either one of the driven members at a time, and having equalized driving power on both vehicle wheels when their speeds are equal or nearly so.

Preferably, the operating parts are formed of metal of sufficient hardness to give a long term of usefulness, but for the purpose of minimizing noise in operation the driving member or the driven members, or all, may be constructed of any suitable or preferred material to obviate noise in operation.

Practicable and workable embodiments of my invention are illustrated in the accompanying drawings, wherein—

Fig. 5 is a view similar to Fig. 2, illustrating a modification;

Fig. 6 is a detail in side elevation of the driving member of Fig. 5 and a portion of the power-imparting means that coöperates therewith;

Fig. 7 is a section on the line 7—7 of Fig. 6;

Fig. 8 is a view similar to Fig. 6 showing another manner of constructing and assembling the driving member;

Figs. 9 and 10 are edge views from the left and right respectively of Fig. 8.

Figure 1:
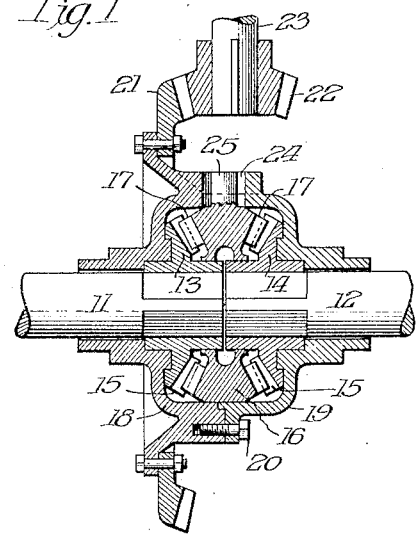
Figure 1 is a longitudinal section of a rear axle differential and axial sections embodying one form of my invention, showing the laterally movable driving member in normal central or driving position wherein it engages both of the driven members.

Referring first to the embodiment of the invention illustrated in Figs. 1 to 4 inclusive, 11 and 12 designate the proximate ends of a two-part rear axle shaft, fast on the inner ends of which are the driven members 13 and 14, respectively, each having an annular series of clutch teeth 15 of the bevel type, and the two annular series of teeth facing each other. Surrounding the shaft ends 11 and 12, and in the instance shown having a bearing on the hubs of the driven members 13 and 14, is a single driving member 16 (Fig. 3), disposed co-axially with the driven members and having an annular series of bevel clutch teeth 17 on each side thereof suitably formed for power-transmiting engagement with the teeth 15 of the driven members 13 and 14. The teeth 15 and 17 are both preferably somewhat longer, and the valleys between the teeth somewhat deeper, than in the case of the ordinary bevel gears used in the common differential of the bevel gear type. The angle of the working faces of the teeth, under varying road conditions, is from 25° to 45°—30° having given good results. The greater length of teeth gives a longer "bite" or bearing surface of the teeth when the power distribution is equalized as in the case of a "straight ahead" movement of the motor vehicle. The number and size of the teeth depends somewhat on the work to be done. Preferably, the driven and driving members are formed with bevel clutch teeth but are not limited to this specific form of tooth.

Sleeved on the axle sections 11 and 12 is the power-imparting means, consisting in this instance of a casing made in two parts, 18 and 19, united by screws 20. Secured to or integral with the member 18 of this casing is a large gear 21 that is engaged and driven by the usual bevel gear 22 on the rear end of the transmission shaft 23.

Figure 2:
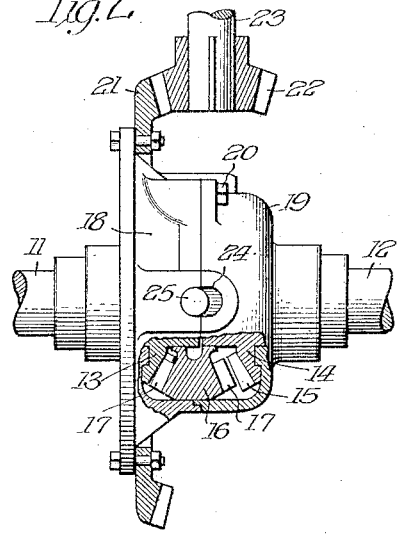
Fig. 2 is a view of the same parts partly in elevation and partly in section, and showing the laterally movable driving member engaged with one of the driven members and freed from the other.
Figure 3:
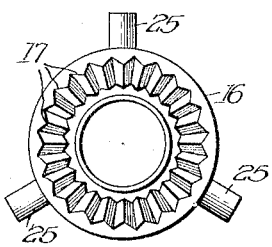
Fig. 3 is a detail in side elevation of the laterally movable driving member.
Figure 4:
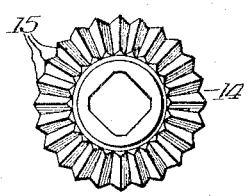
Fig. 4 is a similar detail of one of the driven members.

The circumferential wall of this casing is formed with a series (herein shown as three) of transversely extending slots 24; and these slots are engaged by a corresponding series of pins or studs 25 that extend radially of the driving member 16, said pins or studs being preferably integral with the driving member, as shown. It will be observed by reference to Figs. 1 and 2 that the slots 24 are somewhat longer than the diameter of the studs 25, but are of a width just fitting said studs whereby said driven member is capable of a lateral bodily movement of a sufficient extent to disengage the teeth thereof on one side from the teeth of the coöperating driven member, as illustrated in Fig. 2.

In operation, under normal conditions in which the vehicle is traveling straight ahead, when the power-imparting means is actuated, the single driving member 16, which normally is in mesh with the teeth of both driven members will, by a cam action of the teeth be forced to a position equally in mesh with the teeth of both driven members. When, however, one of the wheels in turning a corner or describing a longer radius curve, or for any other reason, has a greater speed than the other wheel, the road power of the faster moving wheel will, by the cam action of the teeth of the driven member pertaining to said faster wheel, force or slide the driving member bodily and laterally enough to allow the driven member of the wheel having the greater speed to pass the teeth of the driving member, thereby throwing the power of the engine onto the slower-running wheel, until the speeds of the wheels become equal or nearly so, when the driving member will again afford a two-wheel drive in the direction of travel of the vehicle.

Figs. 5 and 10 inclusive illustrate a slight modification wherein the parts corresponding functionally to the studs or pins 25 are formed as a rigid part of the power-imparting means driven by the gear 21 and pinion 22. In this modification, the circumferential wall of the casing is not slotted but is provided with a series of holes 26 of a size to snugly fit the radial arms 27 of a spider member consisting, in addition to said arms 27, of a hub 28 and a central rib or flange 29 on said hub and connecting the arms 27. Mounted on this spider is the driven member which, as shown in Figs. 5, 6 and 7, consists of two annular halves 30 and 30' that fit loosely on the rib 29 of the spider and are united by any suitable means such as the screws 31. In this case the driving member is formed with transverse slots 32 similar to the slots 24, through which slots the arms 27 of the spider pass, whereby the driving member is capable of a lateral bodily movement on and relatively to the spider.

In Figs. 8, 9 and 10 the same construction is carried out, except that the driven member, for purposes of assembling, is made in two halves, 30$^a$ and 30$^b$, divided on a joint that is parallel with, instead of transverse to the axis, this joint being shown as an offset joint 33, which permits the two halves to be brought together by sliding endwise over two of the three arms 27 of the spider, said parts being united as by screws 34.

It will be manifest that in the forms illustrated in Figs. 5 to 10 inclusive the driving member has the same capacity for lateral sliding movement relatively to the power-imparting means, whereby the coöperating clutch teeth may be disengaged on either side when the two wheels run at unequal speeds, as in the construction shown in Figs. 1 to 4 inclusive.

It will be apparent from the drawings and the foregoing description that the distance from the points of the teeth on one side to the points of the teeth on the other side of the driving member is greater than the width of the annular space between the driven members, and that all teeth are comparatively long clutch teeth with a depth between them sufficient to permit bodily lateral movement of the driving member sufficient for compensating clearance of the driven member having greater speed than the driving member.

Changes, variations and modifications in the details of the invention within the scope of the claims, may be resorted to without departing from the spirit or sacrificing any of the advantages thereof; and hence I do not limit my invention to the exact construction and arrangement of parts herein shown and described.

I claim:

1. In a differential mechanism, the combination of a divided or two-part shaft, driven members secured to the proximate ends of said shaft, power imparting means capable of rotation on said shaft, and a single driving member surrounding said shaft between said driven members, said single driving member being connected in driven relation to said power-imparting means and mounted for lateral bodily movement relatively to the latter, whereby it may drivingly engage either or both of said driven members.

2. In a differential mechanism, the combination of a divided or two-part shaft, driven members secured to the proximate ends of said shaft, a single driving member surrounding said shaft between said driven members, and power-imparting means including a casing surrounding said driven and driving members and rotatably mounted on said shaft, said single driving member being connected in driven relation to said casing and mounted for lateral bodily movement relatively to the latter, whereby it may drivingly engage either or both of said driven members.

3. In a differential mechanism, the combination of a divided or two-part shaft, driven members secured to the proximate ends of said shaft and having opposed clutch faces, power-imparting means capable of rotation on said shaft, and a single driving member surrounding said shaft between said driven members and having clutch faces on both sides thereof adapted for coöperative engagement with the clutch faces of said driven members, said single driving member being connected in driven relation to said power imparting means and mounted for lateral bodily movement relatively to the latter, whereby it may have clutch engagement with either or both of said driven members.

4. In a differential mechanism, the combination of a divided or two-part shaft, driven members secured to the proximate ends of said shaft and having opposed annular clutch faces, a single driving member surrounding said shaft between said driven members and having annular clutch faces on both sides thereof adapted for coöperative engagement with the clutch faces of said driven members, and power-imparting means including a casing surrounding said driven and driving members and rotatably mounted on said shaft, said single driving member being connected in driven relation to said casing and mounted for lateral bodily movement relatively to the latter, whereby it may have clutch engagement with either or both of said driven members.

5. In a differential mechanism, the combination of a divided or two-part shaft, driven members secured to the proximate ends of said shaft and having on their opposed faces bevel teeth arranged radially of and around said shaft, power imparting means capable of rotation on said shaft, and a single driving member surrounding said shaft between said driven members and having on its opposite sides bevel teeth arranged radially of and around said shaft and adapted for clutch engagement with the teeth of said driven members, said single driving member being connected in driven relation to said power imparting means and mounted for lateral bodily shifting movement under the cam action thereon of the teeth of said driven members.

6. In a differential mechanism, the combination of a divided or two-part shaft, driven members secured to the proximate ends of said shaft and having on their opposed faces bevel teeth arranged radially of and around said shaft, a single driving member surrounding said shaft between said driven members and having on its opposite sides bevel teeth arranged radially of and around said shaft and adapted for clutch engagement with the teeth of said driven members, and power imparting means including a casing surrounding said driven and driving members and rotatably mounted on said shaft, said single driving member being connected in driven relation to said casing and mounted for lateral bodily shifting movement under the cam action thereon of the teeth of said driven members.

7. In a differential mechanism, the combination of a divided or two-part shaft, driven members secured to the proximate ends of said shaft, power imparting means, including a spider, capable of rotation on said shaft, and a single driving member surrounding said shaft between said driven members, said single driving member being connected in driven relation to said spider and mounted for lateral bodily movement relatively to the latter, whereby it may drivingly engage either or both of said driven members.

8. In a differential mechanism, the combination of a divided or two-part shaft, driven members secured to the proximate ends of said shaft and having on their opposed faces bevel teeth arranged radially of and around said shaft, power imparting means, including a spider, capable of rotation on said shaft, and a single driving member surrounding said shaft between said driven members and having on its opposite sides bevel teeth arranged radially of and around said shaft, said single driving member being connected in driven relation to said spider and mounted for lateral bodily shifting movement under the cam action thereon of the teeth of said driven members.

9. In a differential mechanism, the combination of a divided or two-part shaft, driven members secured to the proximate ends of said shaft, a single driving member surrounding said shaft between said driven members, and power imparting means including a casing surrounding said driven and driving members and rotatably mounted on said shaft, and a spider rigidly mounted in said casing, said single driving member have transverse slots engaged by the arms of said spider whereby it is connected in driven relation to the latter and is capable of bodily lateral movement to engage either or both of said driven members.

10. In a differential mechanism, the combination of a divided or two-part shaft, driven members secured to the proximate ends of said shaft and having on their opposed faces bevel teeth arranged radially of and around said shaft, a single driving member surrounding said shaft between said driven members and having on its opposite sides bevel teeth arranged radially of and around said shaft, and power imparting means including a casing surrounding said driven and driving members and rotatably mounted on said shaft and a spider rigidly mounted in said casing, said single driving member having transverse slots engaged by the arms of said spider whereby it is connected in driven relation to the latter and is capable of bodily lateral movement to engage either or both of said driven members.

11. A device of the class described, comprising a divided shaft, co-axially disposed driven members fixed to the adjacent ends of the divided shaft, power imparting means having a plurality of guideways in one wall thereof, a single driving member having peripheral studs disposed between the driven members and normally in engagement with both of them and slidably connected with the power imparting means to permit lateral bodily movement of the driving member relative to the power imparting means.

12. A device of the class described, comprising a pair of co-axially disposed driven members, having an annular space between them, a single driving member disposed concentric with the driven members, in said annular space, power imparting means having a plurality of guideways in one wall thereof, the single driving member having clutch teeth on both sides for power transmitting engagement with the driven members, said single driving member being slidably connected with the power imparting means to permit lateral bodily movement of the driving member relative to the power imparting means, and a shaft secured to each of said driven members.

13. A device of the class described, comprising a pair of co-axially disposed driven members, having an annular space between them, a single driving member disposed concentric with the driven members, in said annular space, power imparting means having a plurality of guideways in one wall thereof, the single driving member having clutch teeth on both sides for power transmitting engagement with the driven members and peripheral studs having their free ends disposed for travel in the guideways of the power imparting means to permit lateral bodily movement of the driving member, and a shaft secured to each of said driven members.

14. A device of the class described, comprising a divided shaft, co-axially disposed driven members fixed to the adjacent ends of the divided shaft, power imparting means having a plurality of guideways in one wall thereof, a single driving member suitably formed for power transmitting engagement with both of the driven members and having peripheral means for sliding engagement with the power imparting means.

15. In a device of the class described, in combination, power imparting means having a plurality of guideways in its wall, a plurality of driven members having bevel clutch-teeth on one side, a single driving member having bevel clutch-teeth on both sides thereof and normally in engagement with both of the driven members and having peripheral studs slidably connected with the power imparting means to permit lateral bodily movement relative thereto.

FRANK M. LEWIS.

Copies of this patent may be obtained for five cents each, by addressing the "Commissioner of Patents, Washington, D. C."